United States Patent [19]

Yamada et al.

[11] Patent Number: 5,039,650
[45] Date of Patent: Aug. 13, 1991

[54] EXHAUST GAS PURIFICATION CATALYST FOR SUPPRESSING HYDROGEN SULFIDE EVOLUTION, AND PROCESS FOR PRODUCTION THEREOF

[75] Inventors: Teiji Yamada, Numazu; Masaki Funabiki, Mishima; Kunihide Kayano, Numazu, all of Japan

[73] Assignee: N. E. Chemcat Corporation, Tokyo, Japan

[21] Appl. No.: 461,617

[22] Filed: Jan. 8, 1990

[30] Foreign Application Priority Data

Jan. 6, 1989 [JP] Japan ................................. 64-401

[51] Int. Cl.$^5$ ...................... B01J 21/04; B01J 23/10; B01J 22/62
[52] U.S. Cl. .................................. 502/304; 423/213.5
[58] Field of Search ............... 502/304, 326, 223, 349, 502/303, 330, 351; 423/213.5, 230; 585/434

[56] References Cited

U.S. PATENT DOCUMENTS

| | | | |
|---|---|---|---|
| 3,410,920 | 11/1968 | Olson et al. | 502/349 X |
| 3,632,503 | 1/1972 | Hayes | 502/223 X |
| 3,755,481 | 8/1973 | Hayes | 585/434 |
| 3,761,531 | 9/1973 | Bloch | 585/434 |
| 3,878,131 | 4/1975 | Hayes | 502/330 |
| 4,117,082 | 9/1978 | Matsuyama | 423/213.5 X |
| 4,331,565 | 5/1982 | Schaefer et al. | 502/304 |
| 4,619,909 | 10/1986 | Ono et al. | 502/303 |
| 4,714,694 | 12/1987 | Wan et al. | 502/304 |
| 4,760,044 | 7/1988 | Joy, III et al. | 423/213.5 X |
| 4,786,625 | 11/1988 | Imai et al. | 502/326 |
| 4,931,419 | 6/1990 | Blanchard et al. | 502/304 |
| 4,985,387 | 1/1991 | Prigent et al. | 502/304 |

FOREIGN PATENT DOCUMENTS 0251752 7/1988 European Pat. Off. .
2160582 of 1973 France .
122032 9/1976 German Democratic Rep. .

OTHER PUBLICATIONS

Patent Abstracts of Japan vol. 3, No. 14(C-36) 08 Feb. 1979, & JP-A-53 137892 (Ube Kosan K. K.) 12 Jan. 1978, * the whole document *.

Primary Examiner—W. J. Shine
Assistant Examiner—Douglas J. McGinty
Attorney, Agent, or Firm—Wenderoth, Lind & Ponack

[57] ABSTRACT

An exhaust gas purification catalyst for removing carbon monoxide, hydrocarbons and nitrogen oxides from an exhaust gas and suppressing the evolution of hydrogen sulfide comprises a monolithic support and deposited thereon, at least one platinum-group element, active alumina, cerium oxide and germanium oxide. The catalyst is produced by a process which comprises (a) a step of preparing active alumina having a compound of at least one platinum-group element deposited thereon, (b) a step of preparing a slurry comprising the active alumina obtained in step (a), cerium oxide, and germanium oxide, and (c) a step of depositing the slurry on a monolithic support and calcining the support.

8 Claims, No Drawings

EXHAUST GAS PURIFICATION CATALYST FOR SUPPRESSING HYDROGEN SULFIDE EVOLUTION, AND PROCESS FOR PRODUCTION THEREOF

BACKGROUND OF THE INVENTION

1. Field of the Invention

This invention relates to a catalyst for purifying an exhaust gas from an internal combustion engine in automobiles and the like, and to a process for producing it. More specifically, this invention pertains to an exhaust gas purification catalyst which removes carbon monoxide, hydrocarbons and nitrogen oxides from the above exhaust gas, suppresses the evolution of hydrogen sulfide, and at the same time, does not form a toxic substance, and to a process for its production.

2. Description of the Prior Art

Catalysts comprising active alumina having deposited thereon a platinum-group element such as platinum or rhodium and cerium oxide having an oxygen storage effect for increased low-temperature activity are now mainly used as a three-way catalyst for simultaneously removing hydrocarbons, carbon monoxide and nitrogen oxides from exhaust gases generated from internal combustion engines of automobiles and the like (Japanese Laid-Open Patent Publication No. 55225/1979). In such a conventional exhaust gas purification catalyst, sulfur dioxide ($S_{O2}$) formed by the combustion of sulfur-containing compounds in gasoline is usually stored on cerium oxide during running (stoichiometric A/F) and hydrogen sulfide is generated during idling (rich A/F). The hydrogen sulfide thus generated is released as an exhaust gas, which exhaust gas produces an offensive odor due to said hydrogen sulfide.

In order to suppress the evolution of hydrogen sulfide, it has mainly been the previous practice to add a nickel compound to the catalyst (Japanese Laid-Open Patent Publications Nos. 240949/1987 and 310637/1987). However, nickel compounds are not used in some European countries (particularly West Germany) on the ground that during use, they may possibly form toxic nickel carbonyl.

It has been desired therefore to develop an exhaust gas purification catalyst which efficiently removes carbon monoxide, hydrocarbons and nitrogen oxides from an exhaust gas, suppress the evolution of hydrogen sulfide, and at the same time, does not form a toxic substance.

SUMMARY OF THE INVENTION

It is an object of this invention to provide a catalyst which solves the above problems of the prior art, suppresses the formation of hydrogen sulfide, and does not form a toxic substance, and a process for production thereof.

According to the present invention, the above object is achieved by a catalyst for purification of exhaust gases which removes carbon monoxide, hydrocarbons and nitrogen oxides from the exhaust gases and suppreses the evolution of hydrogen sulfide, said catalyst comprising a monolithic support and deposited thereon at least one platinum-group element, active alumina, cerium oxide and germanium oxide.

The object of this invention is also achieved by a process for producing an exhaust gas purification catalyst for removing carbon monoxide, hydrocarbons and nitrogen oxides from an exhaust gas and suppressing the evolution of hydrogen sulfide, which comprises (a) a step of preparing active alumina having at least one platinum-group element deposited thereon, (b) a step of preparing a slurry comprising the active alumina having the platinum-group element deposited thereon, cerium oxide and germanium oxide, and (c) a step of depositing the slurry on a monolithic support and calcining the support.

DETAILED DESCRIPTION OF THE PREFERRED EMBODIMENTS

The catalyst and the process for its production in accordance with this invention will be described below in detail.

[A] First, the catalyst of the invention will be described.

The exhaust gas purification catalyst of this invention comprises a monolithic support and as catalyst ingredients, at least one platinum-group element, active alumina and cerium oxide, and germanium oxide as an ingredient for suppressing the evolution of hydrogen sulfide The catalyst of this invention may additionally contain at least one metal oxide selected from compounds of alkaline earth metals, rare earth metals (excluding cerium oxide) and zirconium.

The catalyst of this invention may have two or more wash-coat layers of the catalyst ingredients on the support.

The monolithic support is composed of a refractory metal oxide or a refractory metal, and may be in the form of a foamed article having a honeycomb or three dimensional network structure.

Examples of the refractory metal oxide include cordierite, mullite, alpha-alumina, silimanite, magnesium silicate, zircon, pentalite, spodumene and aluminosilicates.

Examples of the refractory metal are refractory iron-base alloys and refractory chromium-base alloys.

A honeycomb support composed of cordierite is most preferably used among these monolithic supports.

The catalyst of this invention may desirably contain platinum and rhodium as the platinum-group element for the purpose of removing CO, HC and $NO_x$ simultaneously. The amount of platinum may be any amount which can give the required catalytic activity. Usually, it is 0.1 to 10 g, preferably 0.1 to 3 g, per liter of the catalyst. The amount of rhodium may be any amount which can give the required catalytic activity Usually, it is 0.02 to 2 g, preferably 0.02 to 0.7 g, per liter of the catalyst The active alumina may preferably be gamma-alumina, for example. Its specific surface area is desirably 10 to 300 m²/g, and its amount is usually 30 to 200 g, preferably 40 to 120 g, per liter of the catalyst.

Cerium oxide has an oxygen storage effect, and reduces the amount of the platinum-group element required to maintain the same purifying ability. Its weight is usually 10 to 150 g, preferably 10 to 50 g, per liter of the catalyst Desirably, cerium oxide has a specific surface area of 10 to 300 m2/g.

Germanium oxide is effective for suppressing the evolution of hydrogen sulfide The amount of germanium oxide effected to suppress the formation of hydrogen sulfide is usually 1 to 50 g, preferably 3 to 30 g, per liter of the catalyst. Since germanium oxide is expensive, its amount is preferably as small as possible, for example 3 to 10 g per liter of the catalyst so long as it is effective for suppressing the evolution of hydrogen sulfide. [B] Now, the process for producing the exhaust gas purification catalyst of this invention will be described.

Preparation of active alumina having the platinum deposited on it

Active alumina (for example, gamma-alumina) is put in a mixer. Active alumina desirably has a particle diameter of 1 to 100 microns, preferably 1 to 50 microns, more preferably 1 to 30 microns. Active alumina may be mixed with part or the whole of cerium oxide and/or germanium oxide.

At least one platinum-group element compound such as a platinum compound (e.g., an amine solution of hexahydroplatinic acid, or chloroplatinic acid) is added to active alumina. The platinum-group element compound may be added at the time the gamma is stirred by a mixer and preferably the platinum-group element is added in small proportions. The platinum-group element compound may be added as a solution (such as an aqueous solution) or a suspension (such as an aqueous suspension). The amount of the platinum-group element to be added may be 1 to 100 g as the platinum-group element, per kilogram of active alumina, and may be 100 to 500 ml as a solution of the platinum-group element compound.

Subsequently, a compound of another type of a platinum-group element, for example a rhodium compound such as rhodium nitrate or rhodium chloride may be added to the mixture containing active alumina and the above platinum-group element compound. The other platinum-group element compound may be added little by little. The other platinum-group element compound, such as a rhodium compound, may be added as a solution or suspension. The amount of the other platinum-group compound to be added, may be 0.2 to 50 g, calculated as the other platinum-group element, such as rhodium, per kilogram of active alumina, and may be 100 to 500 ml as a solution of the other platinum-group element compound such as a rhodium compound.

Subsequently, an acetic acid solution, preferably a 10 to 40 % by weight aqueous solution of acetic acid, is added to the mixture containing the platinum-group element compound and active alumina. Preferably, the acetic acid solution is added little by little while the mixture is stirred. The amount of acetic acid to be added may be 100 to 300 ml per kilogram of active alumina.

Preparation of a slurry

The active alumina having at least one type of a platinum-group element deposited thereon, cerium oxide, germanium oxide, acetic acid and deionized water are introduced into a mill and pulverized to form a alurry.

The amount of cerium oxide is 50 to 500 g, preferably 150 to 400 g, per kilogram of active alumina.

The amount of germanium oxide may be 12.5 to 625 g, preferably 35 to 375 g, more preferably 35 to 125 g, per kilogram of active alumina.

The amount of acetic acid may be 50 to 300 ml per kilogram of active alumina preferably as a 60 to 90 % by weight aqueous solution.

The pulverization by the mill can reduce the average particle diameter of the mixture in the slurry to 0.1 to 10 microns, preferably 1 to 5 microns.

The resulting slurry is transferred to a receptacle and deionized water is added to form a slurry having a predetermined specific gravity which may be, for example, 1.20 to 1.85 g/ml.

Deposition of the slurry on a monolithic support

The slurry prepared above is deposited on a monolithic support which is described in section [A] above.

The slurry is coated on the monolithic support for a period of, for example, 1 to 60 seconds, and then the excess of the slurry in the cells is removed by air blowing. The support coated with the slurry is then dried, for example, with hot air, preferably hot air at 20° to 100 ° C., to remove at least 50 %, preferably 90 %, of the moisture. After the moisture removal, the support may be calcined in air for example, at a temperature of 200° to 900 ° C., preferably 300° to 800 ° C., for 10 minutes to 10 hours, preferably 15 to 60 minutes. When the temperature of the support is gradually raised in the calcination, the above drying (removal of moisture) may be omitted.

By the above step of depositing the slurry, it is 30 to 200 g of alumina having at least one platinum-group element such as platinum or rhodium, deposited thereon, 10 to 150 g of cerium oxide and 1 to 50 g of germanium oxide, for example, per liter of the support can be deposited on the monolithic support.

EXAMPLES

The following examples illustrate the present invention more specifically.

Example 1

(a) Active alumina (1.2 kg) having a BET surface area of $150 m^2/g$ and an average particle diameter of 30 microns was put in a mixer, and while the active alumina was stirred, 300 ml of an aqueous amine solution of hexahydroplatinic acid containing 23.3 g of platinum was added dropwise little by little and uniformly dispersed. Subsequently, 150 ml of an aqueous of rhodium nitrate containing 4.7 g of rhodium was added dropwise little by little and uniformly dispersed.

Finally, 100 ml of 25 % acetic acid was added dropwise little by little and uniformly dispersed to prepare an alumina powder having platinum and rhodium deposited on it (Pt/Rh weight ratio=5/1).

(b) 640 g, as dry weight, of the alumina powder having platinum and rhodium deposited on it which was obtained in the step described in (a) above, 320 g of cerium oxide having an average particle diameter of 15 microns, 40 g of germanium oxide, 71 ml of 90 % by weight acetic acid and 550 ml of deionized water were introduced into a mill, and mixed and pulverized to give an alumina slurry. The pulverization time was adjusted such that more than 90 % of the particles in the slurry had a particle diameter of not more than 9.0 microns.

(c) Deionized water was added to the slurry obtained by the step described in (b) above to adjust its specific gravity to 1.60 g/ml and obtain a diluted slurry. A cylindrical cordierite monolithic support (diameter 93 mm; length 147.5 mm; volume 1.0 liter: 400 cells/in$^2$) was immersed in the diluted slurry for 5 seconds, and withdrawn from the diluted slurry. Air was blown against the support to remove the excess of the slurry. The support was dried at 30° to 60 ° C., and then calcined at 500 ° C. for 30 minutes to give a catalyst A.

Catalyst A obtained by a series of steps (a), (b) and (c) contained 1.6 g of platinum and rhodium combined, 80 g of alumina, 40 g of cerium and 5 g of germanium oxide per liter of the finished catalyst.

COMPARATIVE EXAMPLE 1

Catalyst B was obtained by repeating Example 1 except that germanium oxide was not added in step (b) of Example 1.

COMPARATIVE EXAMPLE 2

Catalyst C was obtained by repeating Example 1 except that cerium oxide was not added in step (b) of Example 1.

COMPARATIVE EXAMPLE 3

Catalyst D was obtained by repeating Example 1 except that instead of germanium oxide, nickel oxide was used in the same weight in step (b) of Example 1.

EXAMPLE 2

Example 1 was repeated except that the amount of germanium oxide was changed to 8 g from 40 g in step (b) of Example 1. Catalyst E was obtained which contained 1 g of germanium oxide per liter of the finished catalyst.

EXAMPLE 3

Example 1 was repeated except that the amount of germanium oxide was changed to 24 g from 40 g in step (b) of Example 1. Catalyst F was obtained which contained 3 g of germanium oxide per liter of the finished catalyst.

EXAMPLE 4

Example 1 was repeated except that the amount of germanium oxide was changed to 80 g from 40 g in step (b) of Example 1. Catalyst G was obtained which contained 10 g of germanium oxide per liter of the finished catalyst.

EXAMPLE 5

Example 1 was repeated except that the amount of germanium oxide was changed to 120 g from 40 g in step (b) of Example 1. Catalyst H was obtained which contained 15 g of germanium oxide per liter of the finished catalyst.

EXAMPLE 6

Example 1 was repeated except that the amount of germanium oxide was changed to 240 g from 40 g in step (b) of Example 1. Catalyst I was obtained which contained 30 g of germanium oxide per liter of the finished catalyst.

TEST EXAMPLE 1

Each of the catalysts (sample designations A to I) obtained in Examples 1 to 6 and Comparative Examples 1 to 3 was filled in a stainless steel multiconverter, and under the following conditions, a gas simulating an actual exhaust gas was passed through the multiconverter, and the amount of $H_2S$ released was measured at the exit of the catalyst layer. Thus, the H2S suppressing property of each of the catalysts was evaluated.
Amount of sulfur in gasoline: 0.035 % by weight

Operating Conditions (a) Pre-treating conditions. Temperature at the inlet of the catalyst: 600 °C. Air-fuel ratio (A/F): 14.7. Treating time: 5 minutes.

(b) $S_{O2}$ storage conditions. Temperature at the inlet of the catalyst: 200–500 °C. Temperature elevating rate: 12 °C./min. Treating time: 25 minutes. A/F: 14.7.

(c) $H_2S$ releasing conditions Temperature at the inlet of the catalyst: 500 °C. A/F: 13.9.

Item of Evaluation

The concentration of $H_2S$ released at the exit of the catalyst for 30 seconds from 15 seconds to 45 seconds after the stoichiometric A/F changed to the rich

Method of Evaluation

Kitagawa-type detecting tube

TEST EXAMPLE 2

Each of the catalysts (sample designations A to I) obtained in Examples 1 to 6 and Comparative Examples 1 to 3 was subjected to a durability test by the following method, and its performance was evaluated.

Durability Conditions

Each of the catalysts was filled in a stainless steel multiconverter, and under the following conditions, a gas simulating an actual exhaust gas was passed through the multiconverter for 50 hours.
Air-fuel ratio (A/F): 14.7. Temperature of the catalyst bed: 800 °C. Fuel: gasoline (unleaded).

Conditions for Evaluating the Performance of Catalyst

Each of the catalysts was filled in the same multiconverter as described above but fitted with a sampling tube, and the inlet and outlet gas components in each catalyst were analyzed by MEXA 8120 (Horiba Seisakusho).

The performance of the catalyst was evaluated under the following conditions by using a gas simulating an actual exhaust gas.
Air-fuel ratio: 14.55, 14.7, 14.85 Space velocity (SV): 133,000/hr . Catalyst inlet temperature: 350 °C.

The purification ratios of the components (CO, HC, NO) are shown by average values of purification ratios at the above A/F ratios.

The results of Test Examples 1 and 2 are shown in Tables 1 to 3.

TABLE 1

| Run | Sample designation | GeO$_2$ (g/liter) | CeO$_2$ (g/liter) | Amount of H$_2$S released (ppm) | Purification ratio (%) after the durability test | | |
|---|---|---|---|---|---|---|---|
| | | | | | CO | HC | NO$_X$ |
| Example 1 | A | 5 | 40 | 61 | 74 | 79 | 74 |
| Comparative Example 1 | B | none | 40 | 210 | 71 | 79 | 73 |
| Comparative | C | 5 | none | 58 | 53 | 42 | 49 |

TABLE 1-continued

| Run | Sample designation | GeO₂ (g/liter) | CeO₂ (g/liter) | Amount of H₂S released (ppm) | Purification ratio (%) after the durability test | | |
|---|---|---|---|---|---|---|---|
| | | | | | CO | HC | NOₓ |
| Example 2 | | | | | | | |

(*1): In each of the samples, the amount of the platinum-group metals and the Pt/Rh ratio were constant at 1.6 g/liter and 5/1, respectively, and the number of its cells was also constant at 400 cpi². These catalysts contained 80 g/liter of active alumina in addition to the catalyst ingredients indicated in the table.
(*2): The catalysts were evaluated at a temperature of 350° C.

TABLE 2

| Run | Sample designation | Substance added | Amount of H₂S released (ppm) | Purification ratio (%) after the durability test | | |
|---|---|---|---|---|---|---|
| | | | | CO | HC | NOₓ |
| Example 1 | A | GEO₂ | 61 | 74 | 79 | 74 |
| Comparative Example 3 | D | NiO | 66 | 72 | 75 | 72 |
| Comparative Example 1 | B | none | 210 | 71 | 79 | 73 |

(*1): In each of the samples, the amount of the platinum-group metals and the Pt/Rh ratio were constant at 1.6 g/liter and 5/1, respectively, and the number of its cells was also constant at 400 cpi². These catalysts contained 80 g/liter of active alumina and 40 g/liter of cerium oxide in addition to the catalyst ingredients indicated in the table.
(*2): The weight of the added substance was constant at 5 g/liter.
(*3): The catalysts were evaluated at a temperature of 350° C.

TABLE 3

| Run | Sample designation | Amount of GEO₂ added (g/liter) | Amount of H₂S released (ppm) | Purification ratio (%) after the durability test | | |
|---|---|---|---|---|---|---|
| | | | | CO | HC | NOₓ |
| Comparative Example 1 | B | 0 | 210 | 71 | 79 | 73 |
| Example 2 | E | 1 | 198 | 72 | 78 | 73 |
| Example 3 | F | 3 | 86 | 74 | 79 | 73 |
| Example 1 | A | 5 | 61 | 74 | 79 | 74 |
| Example 4 | G | 10 | 60 | 74 | 79 | 74 |
| Example 5 | H | 15 | 58 | 73 | 79 | 74 |
| Example 6 | I | 30 | 55 | 70 | 78 | 73 |

(*1): In each of the samples, the amount of the platinum-group metals and the Pt/Rh ratio were constant at 1.6 g/liter and 5/1, respectively, and the number of its cells was also constant at 400 cpi². These catalysts contained 80 g/liter of active alumina and 40 g/liter of cerium oxide in addition to the catalyst ingredients indicated in the table.
(*2): The catalysts were evaluated at a temperature of 350° C.

Table 1 shows the effects of germanium oxide and cerium oxide on the amount of H₂S released and the purification ratios after the durability test.

Table 2 shows the effects of germanium oxide and nickel oxide on the amount of H₂S released and the purification ratios after the durability test.

Table 3 shows the effect of the amount of germanium oxide on the amount of H₂S released and the purification ratios after the durability test.

As can be seen from Table 1, the catalyst (sample A) containing germanium oxide and cerium oxide markedly suppresses the evolution of H₂S, and maintains an equivalent ability to purify an exhaust gas to a conventional catalyst (sample B) containing cerium oxide but being free from germanium oxide.

As can be seen from Table 2, the catalyst of the invention (sample A) containing germanium oxide has the ability to suppress the evolution of H₂S and the ability to purify exhaust gases, which are equivalent to those of a conventional catalyst (sample D) containing nickel oxide, of which use is regulated in some countries such as West Germany.

It is seen from Table 3 that the amount of germanium oxide to be added to suppress the evolution of H₂S is usually 1 to 50 g, preferably 3 to 30 g, per liter of the catalyst.

EFFECTS OF THE INVENTION

As stated above, the catalyst of this invention comprising a monolithic support and deposited thereon, at least one platinum-group element, active alumina, cerium oxide and germanium oxide produces an effect of markedly suppressing hydrogen sulfide without impairing its exhaust gas purifying ability and does not form a toxic substance.

We claim:

1. An exhaust gas purification catalyst for removing carbon monoxide, hydrocarbons and nitrogen oxides from an exhaust gas and suppressing the formation of hydrogen sulfide, said catalyst comprising a monolithic support and deposited thereon, at least one platinum-group element, active alumina, cerium oxide and germanium oxide.

2. A catalyst of claim 1 comprising a monolithic support and deposited thereon, platinum, rhodium, active alumina, cerium oxide and germanium oxide.

3. The catalyst of claim 2 comprising a monolithic support and deposited thereon, 0.1 to 10 g of platinum, 0.02 to 2 g of rhodium, 30 to 200 g of active alumina, 10 to 150 g of cerium oxide and 1 to 50 g of germanium oxide, the amounts being per liter of the catalyst.

4. The catalyst of claim 2 comprising a monolithic support and supported thereon, 0.1 to 3 g of platinum, 0.02 to 0.7 g of rhodium >40 to 120 g of active alumina, 10 to 50 g of cerium oxide and 3 to 30 g of germanium oxide, the amounts being per liter of the catalyst.

5. The process for producing an exhaust gas purification catalyst for removing carbon monoxide, hydrocarbons and nitrogen oxides from an exhaust gas and suppressing the formation of hydrogen sulfide, which comprises (a) a step of preparing active alumina having a compound of at least one platinum-group element deposited thereon, (b) a step of preparing a slurry comprising the active alumina obtained in step (a), cerium oxide, and germanium oxide, and (c) a step of depositing the slurry on a monolithic support and calcining the support.

6. A process for producing an exhaust gas purification catalyst set forth in claim 2 for removing carbon monoxide, hydrocarbons and nitrogen oxides from an exhaust gas and suppressing the evolution of hydrogen sulfide, which comprises (a) a step of preparing active alumina having a platinum compound and a rhodium compound deposited thereon, (b) a step of preparing a slurry comprising the active alumina obtained in step (a), cerium oxide, and germanium oxide, and (c) a step of depositing the slurry on a monolithic support and calcining the support.

7. A process for producing an exhaust gas purification catalyst set forth in claim 3 for removing carbon monoxide, hydrocarbons and nitrogen oxides from an exhaust gas and suppressing the formation of hydrogen sulfide, which comprises (a) a step of preparing active alumina having deposited thereon 1 to 100 g, as platinum, of a platinum compound and 0.2 to 50 g, as rhodium, of a rhodium compound, the amounts being per kilogram of active alumina, (b) a step of preparing a slurry comprising the active alumina obtained in step (a), 50 to 500 g, per kilogram of the active alumina, of cerium oxide, and 12.5 to 625 g, per kilogram of the active alumina, of germanium oxide, and (c) a step of depositing the slurry on a monolithic support and calcining the support.

8. A process for producing an exhaust gas purification catalyst set forth in claim 4 for removing carbon monoxide, hydrocarbons and nitrogen oxides from an exhaust gas and suppressing the formation of hydrogen sulfide, which comprises (a) a step of preparing active alumina having deposited thereon 1 to 100 g, as platinum, of a platinum compound and 0.2 to 50 g, as rhodium, of a rhodium compound, the amounts being per kilogram of active alumina, (b) a step of preparing a slurry comprising the active alumina obtained in step (a), 150 to 400 g, per kilogram of the active alumina, of cerium oxide, and 35 to 375 g, per kilogram of the active alumina, of germanium oxide, and (c) a step of depositing the slurry on a monolithic support and calcining the support.

* * * * *